United States Patent
Kwon et al.

(10) Patent No.: US 10,585,285 B2
(45) Date of Patent: Mar. 10, 2020

(54) HEAD MOUNTED DISPLAY DEVICE

(71) Applicant: SAMSUNG DISPLAY CO., LTD., Yongin-si, Gyeonggi-do (KR)

(72) Inventors: Jae Joong Kwon, Suwon-si (KR); Joo Woan Cho, Seongnam-si (KR); Yi Joon Ahn, Seoul (KR)

(73) Assignee: Samsung Display Co., Ltd. (KR)

( * ) Notice: Subject to any disclaimer, the term of this patent is extended or adjusted under 35 U.S.C. 154(b) by 109 days.

(21) Appl. No.: 15/891,899

(22) Filed: Feb. 8, 2018

(65) Prior Publication Data
US 2018/0275406 A1 Sep. 27, 2018

(30) Foreign Application Priority Data

Mar. 22, 2017 (KR) .................. 10-2017-0036321

(51) Int. Cl.
*G02B 27/01* (2006.01)
*G02B 27/09* (2006.01)
*G02B 3/00* (2006.01)

(52) U.S. Cl.
CPC ..... *G02B 27/0172* (2013.01); *G02B 27/0961* (2013.01); *G02B 3/0056* (2013.01); *G02B 2027/015* (2013.01)

(58) Field of Classification Search
CPC .............. G02B 27/0172; G02B 27/017; G02B 27/0961; G02B 3/0056; G02B 2027/015; G06F 3/017; G06F 3/01; G09G 5/377; G09G 5/01
See application file for complete search history.

(56) References Cited

U.S. PATENT DOCUMENTS 5,466,926 A * 11/1995 Sasano ................ G02B 3/0018
250/216
2010/0097671 A1 4/2010 Leister
2013/0285885 A1 10/2013 Nowatzyk et al.
2015/0091789 A1* 4/2015 Alzate ................ G02B 27/0172
345/156
2016/0370591 A1 12/2016 Wilson et al.

FOREIGN PATENT DOCUMENTS

| KR | 10-2004-0021452 A | 3/2004 |
| KR | 10-2015-0003760 A | 1/2015 |
| KR | 10-2016-0014875 A | 2/2016 |
| KR | 10-2016-0093039 A | 8/2016 |
| WO | 10-2015-077718 A1 | 5/2015 |

* cited by examiner

*Primary Examiner* — Robert J Michaud
(74) *Attorney, Agent, or Firm* — Innovation Counsel LLP

(57) ABSTRACT

The present disclosure relates to a head mounted display device, and a head mounted display device according to an exemplary embodiment includes: a display panel including a plurality of pixels; and a microlens array that includes a plurality of lenses that respectively overlap the plurality of pixels wherein the plurality of pixels and the plurality of lenses have one-to one correspondence.

25 Claims, 11 Drawing Sheets

HEAD MOUNTED DISPLAY DEVICE

RELATED APPLICATIONS

This application claims priority to and the benefit of Korean Patent Application No. 10-2017-0036321 filed in the Korean Intellectual Property Office on Mar. 22, 2017, the entire contents of which are incorporated herein by reference.

BACKGROUND

1. Field

The described technology relates generally to a head mounted display device.

2. Description of the Related Art

A head mounted display (HMD) is a device that is mounted on the head of a user and displays an image to the user, and has been highlighted as a visualization device that provides virtual reality (VR) and augmented reality (AR).

The head mounted display device includes a display panel that displays an image and an eyepiece lens that is disposed between the display panel and the user. The eyepiece lens serves to show an image from the display panel as an enlarged virtual image. The display panel includes a plurality of pixels and a light blocking area that is disposed between the plurality of pixels. In this case, the eyepiece lens enlarges not only the plurality of pixels but also the light blocking area, and thus a lattice pattern like a mosquito net is seen. That is, a screen door effect occurs. In addition, the eyepiece lens is heavy and large, so the display device cannot be light-weighted and reduced in size.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a head mounted display device that can prevent occurrence of a screen door effect, and reduce weight and size of the display device.

A head mounted display device according to an exemplary embodiment includes: a display panel including a plurality of pixels; and a microlens array that includes a plurality of lenses that respectively overlap the plurality of pixels wherein the plurality of pixels and the plurality of lenses have one-to-one correspondence.

The plurality of lenses may have different focal distances.

The plurality of lenses may include a first lens having a shortest distance from a pupil of a user, and the first lens may have the shortest focal distance among the plurality of lenses.

The plurality of lenses may further include a second lens having a longest distance from the pupil of the user, and the second lens may have the longest focal distance among the plurality of lenses.

The plurality of lenses may further include a third lens that is disposed between the first lens and the second lens, and a focal distance of the third lens is given as in the following equation:

$$f(\theta) = (f2-f1)/\theta_{max} \times \theta + f1$$

($\theta$: an angle formed by a first extension that connects the pupil of the user and the first lens and a third extension line that connects the pupil of the user and the third lens, f1: a focal distance of the first lens, f2: a focal distance of the second lens, $\theta_{max}$: an angle formed by the first extension line and a second extension line that connects the pupil of the user and the second lens).

The first lens may be disposed in a center portion of the microlens array, and the second lens may be disposed in an edge portion of the microlens array.

A focal distance of the lens may be gradually increased from the center portion of the microlens array toward the edge portion of the microlens array.

The plurality of pixels may include a first pixel, a second pixel, and a third pixel, light emitted from the first pixel may pass through the first lens, light emitted from the second pixel may pass through the second lens, and light emitted from the third pixel may pass through the third lens.

The first extension line may go through the first pixel, the second extension line may go through the second pixel, the third extension line may go through the third pixel, and the first extension line, the second extension line, and the third extension line may meet at one spot.

The pupil of the user may be located at the spot where the first extension line, the second extension line, and the third extension line meet.

A thickness of a center portion of the third lens may be thinner than a thickness of a center portion of the first lens and thicker than a thickness of a center portion of the second lens.

A distance between the first pixel and the third pixel may be longer than a distance between the first lens and the third lens, and a distance between the third pixel and the second pixel may be longer than a distance between the third lens and the second lens.

A distance between two adjacent pixels among the plurality of pixels may be longer than a distance between two adjacent lenses among the plurality of lenses.

The number of the plurality of pixels may correspond to the number of the plurality of lenses.

The plurality of pixels may be disposed in a circumference of a first circle having a purple of a user as a center and the plurality of lens may be disposed in a circumference of a second circle having the purple of the user as the center.

The first circle and the second circle may be concentric circle.

A radius of the first circle may be larger than a radius of the second circle.

A head mounted display device according to an exemplary embodiment includes: a display panel that includes a plurality of pixels; a microlens array that includes a plurality of lenses that respectively overlap the plurality of pixels; and a correction layer that is provided between the display panel and the microlens array.

A thickness of the correction layer may be changed depending on locations.

the plurality of lenses may include a first lens having a shortest distance from a pupil of a user, the plurality of pixels may include a first pixel that supplies light to the first lens, and a first portion of the correction layer, disposed between the first lens and the first pixel, may have the thinnest thickness.

The plurality of lenses may include a first lens having a shortest distance from a pupil of a user, the plurality of pixels may include a first pixel that supplies light to the first lens, and a first portion of the correction layer, disposed between the first lens and the first pixel, may have the thinnest thickness.

A thickness of the correction layer may be gradually increased from the first portion toward the second portion.

The thickness of the correction layer may be increased step by step from the first portion toward the second portion.

The first lens may be disposed in a center portion of the microlens array and the second lens may be disposed in an edge portion of the microlens array.

A first extension line that connects the first pixel and the first lens and a second extension line that connects the second pixel and the second lens may meet at a spot where the pupil of the user is located.

A distance between the first pixel and the second pixel may be longer than a distance between the first lens and the second lens.

A distance between two adjacent pixels among the plurality of pixels may be longer than a distance between two adjacent lenses among the plurality of lenses.

The correction layer may be formed of a material having a higher refractive index than the surroundings.

The plurality of lenses may respectively have the same focal distance.

According to the exemplary embodiments, the microlens array is used instead of using an eyepiece lens so that occurrence of the screen door effect can be prevented and the weight and the size of the head mounted display device can be reduced.

Further, the focal distance can be corrected according to locations so that deterioration of image quality due to Petzval field curvature can be prevented.

DETAILED DESCRIPTION

Figure 1:
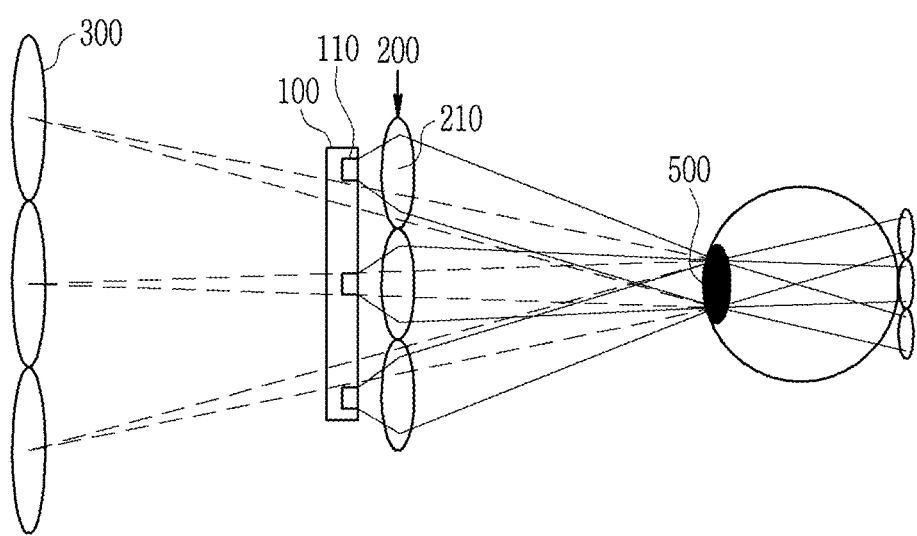
FIG. 1 is a schematic view of a head mounted display device according to an exemplary embodiment.

Hereinafter, exemplary embodiments will be described in detail with reference to the accompanying drawings so that those skilled in the technical field to which the present invention pertains may easily carry out the exemplary embodiments. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In addition, a size and a thickness of each configuration illustrated in the drawings are arbitrarily shown for better understanding and ease of description, but the present invention is not necessarily limited thereto. In the drawings, the thickness of layers, films, panels, regions, etc., are exaggerated for clarity.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Throughout the specification, the word "on" means positioning on or below the object portion, and does not essentially mean positioning on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

In this specification, the phrase "on a plane" means viewing a target portion from the top, and the phrase "on a cross-section" means viewing a cross-section formed by vertically cutting a target portion from the side.

First, referring to FIG. 1 to FIG. 7, a head mounted display device according to an exemplary embodiment will be described.

Figure 2:
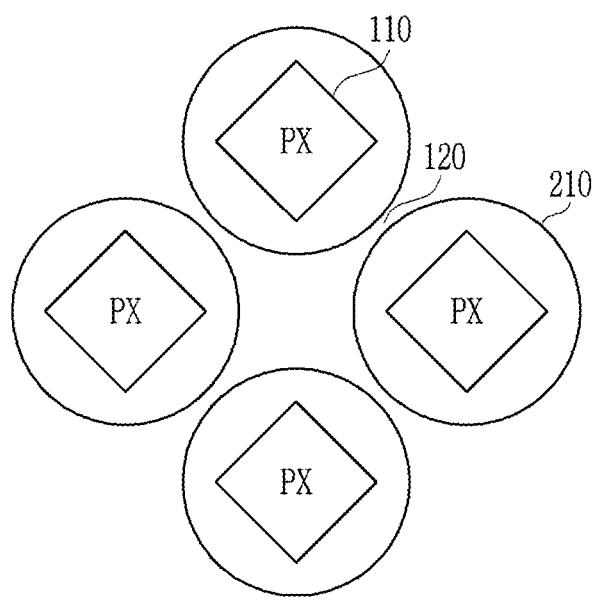
FIG. 2 is a top plan view of a plurality of pixels and a plurality of lenses of the head mounted display device according to the exemplary embodiment.
Figure 3:
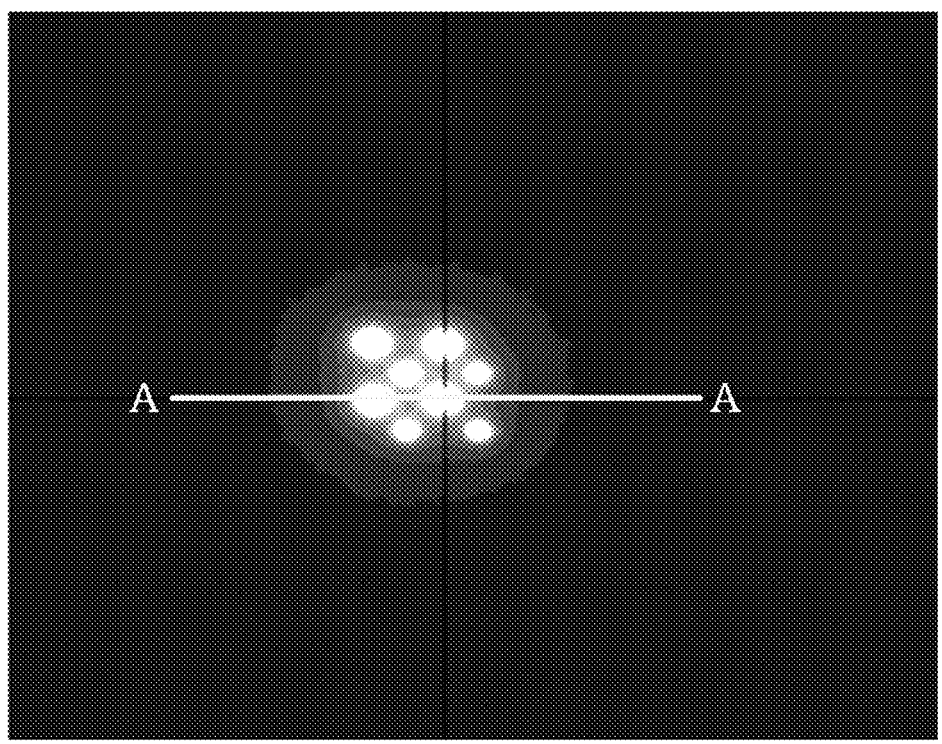
FIG. 3 shows an image of a head mounted display device according to a comparative example.
Figure 4:
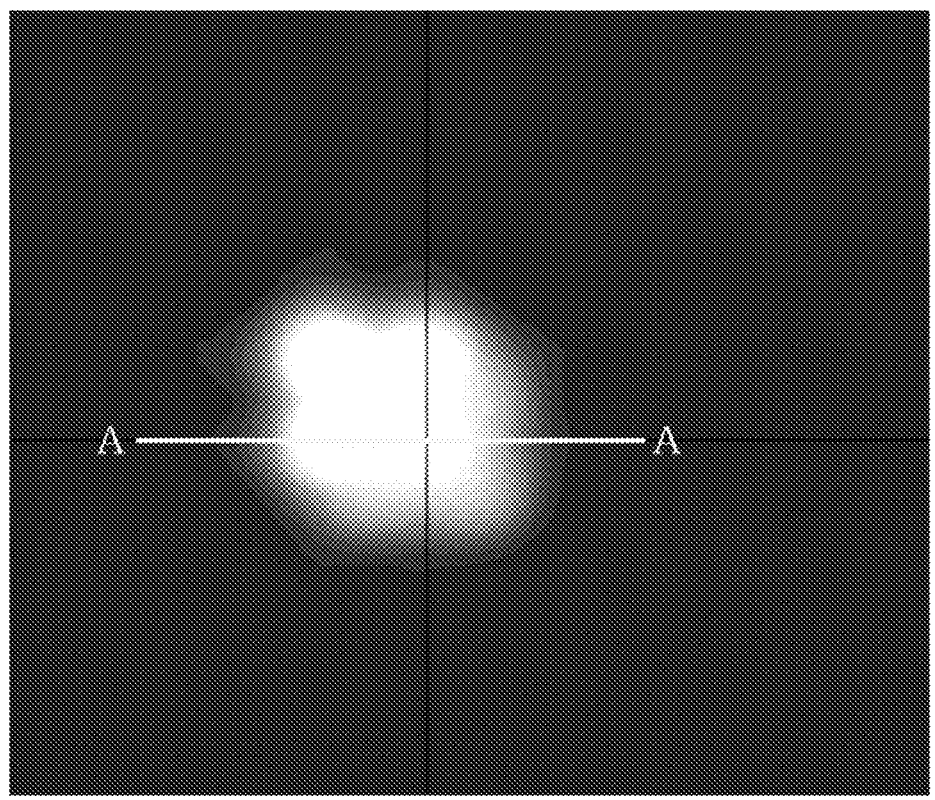
FIG. 4 shows an image of the head mounted display device according to the exemplary embodiment.
Figure 5:
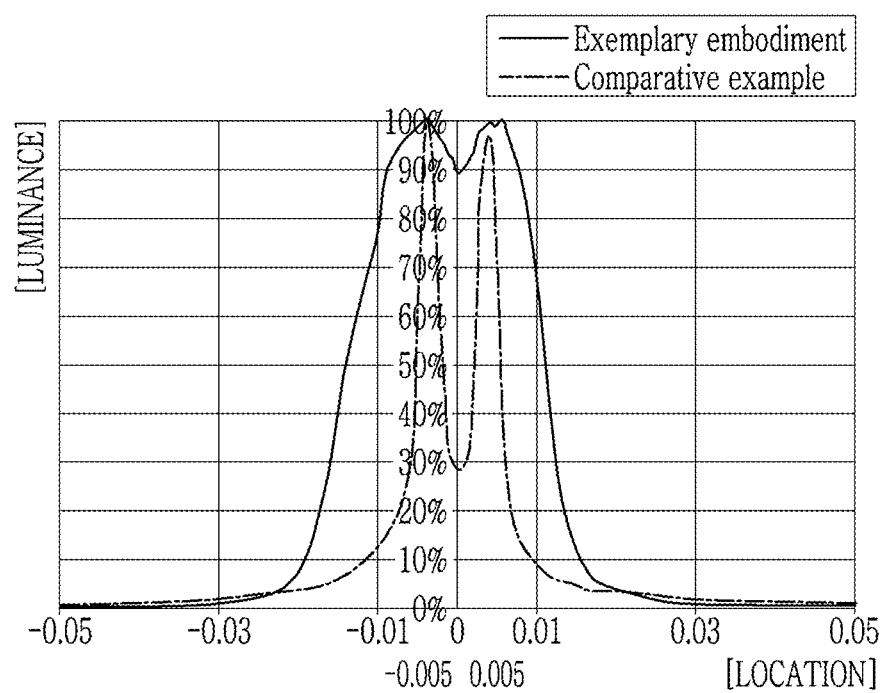
FIG. 5 is a graph illustrating luminance depending on locations on the line A-A of FIG. 3 and FIG. 4.
Figure 6:
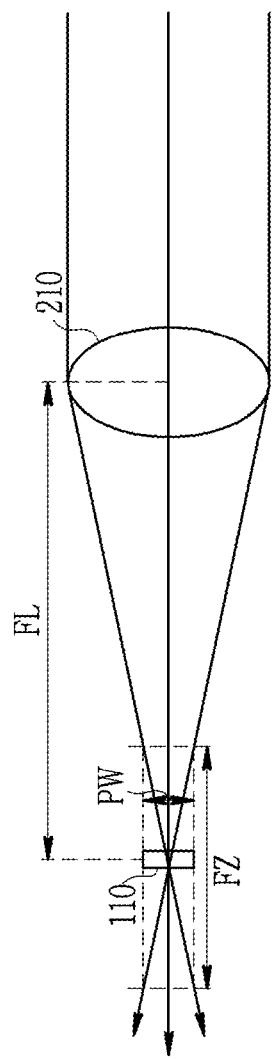
FIG. 6 is a schematic view of one pixel and one lens of the head mounted display device according to the exemplary embodiment.
Figure 7:
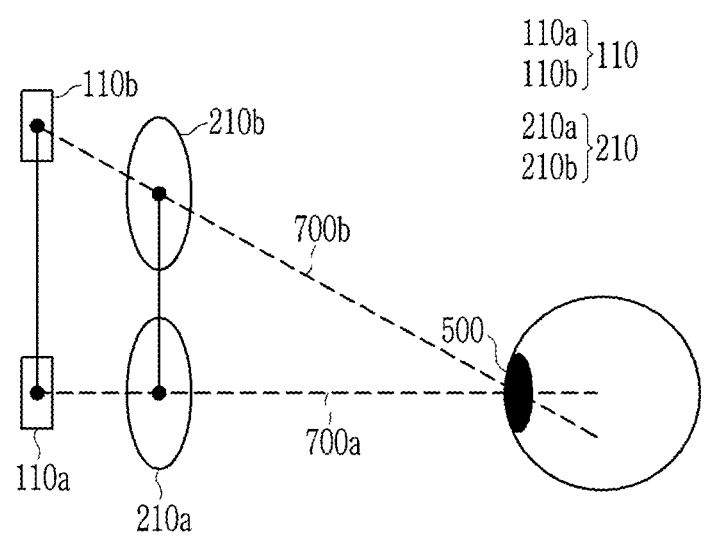
FIG. 7 is a schematic view of pixels, lenses, and a pupil of a user of the head mounted display device according to the exemplary embodiment.

FIG. 1 schematically shows a head mounted display device according to an exemplary embodiment, and FIG. 2 is a top plan view of a plurality of pixels and a plurality of lenses of the head mounted display device according to the exemplary embodiment. FIG. 3 shows an image of a head mounted display device according to a comparative example, and FIG. 4 shows an image of the head mounted display device according to the exemplary embodiment. FIG. 3 and FIG. 4 show simulation results. FIG. 5 is a graph that shows luminance according to a location on the line A-A of FIG. 3 and FIG. 4. In FIG. 5, the horizontal axis denotes a location and the vertical axis denotes luminance FIG. 6 is a schematic view of a pixel and a lens of the head mounted display device according to the exemplary embodiment, and FIG. 7 is a schematic view of the pixel and the lens of the head mounted display device and a pupil of the eye of a user according to the exemplary embodiment.

As shown in FIG. 1, a head mounted display device according to an exemplary embodiment includes a display panel 100 and a microlens array 200.

Although it is not illustrated, the display panel 100 and the microlens array 200 may be included in a head mount device which is mounted on the head of the user. The case may have various shapes, and for example, may be formed in the shape of spectacles or a helmet.

The display panel 100 may be provided as a flat panel where a screen can be displayed, and for example, may be provided as an organic light emitting diode (OLED) panel, a liquid crystal display (LCD) panel, and the like.

The display panel 100 includes a plurality of pixels 110. The plurality of pixels 110 may be disposed with a regular interval. Although the display panel 100 includes three pixels 110 in FIG. 1 for convenience of illustration and description, the display panel 100 may include more than three pixels 110.

The microlens array 200 is provided as a film and may be attached to the display panel 100, or may be provided as an additional layer through a photo and etching process on the display panel 100. However, the present invention is not limited thereto, and the microlens array 200 may have various shapes and may be formed through various methods.

The microlens array 200 includes a plurality of lenses 210. The plurality of lenses 210 may be disposed at a regular interval. The number of lenses 210 corresponds to the number of pixels 110. In FIG. 1, three lenses 210 are illustrated corresponding to the three pixels 110. When the display panel 100 includes about 1,000,000 pixels, the microlens array 200 may include about 1,000,000 lenses. That is, the number of lenses 210 may be substantially the same as the number of pixels 110.

Light emitted from the pixels 110 of the display panel 100 passes through the lenses 210 of the microlens array 200 and then is transmitted to pupils 500 of the user. Each lens 210 of the microlens array 200 serves to display each pixel 110 as an enlarged virtual image 300. Thus, an image displayed by the display panel 100 is enlarged by the microlens array 200 and is thus viewed as the virtual image 300 by the pupils 500 of the user.

As shown in FIG. 2, the respective pixels 110 of the display panel 100 and the respective lenses 210 of the microlens array 200 are overlapped with each other. One pixel 110 overlaps one lens 210.

The display panel 100 includes a light blocking area 120 that is disposed between the plurality of pixels 110. A light blocking member such as a black matrix is formed in the light blocking area 120 such that no light passes through the light blocking area 120.

In a head mounted display device where one or two eyepiece lenses are formed corresponding to a plurality of pixels 110 according to a comparative example, the eyepiece is extended not only to the plurality of pixels 110 but also to the light blocking area 120, thereby causing a screen door effect as shown in FIG. 3. In the head mounted display device according to the exemplary embodiment, the lenses 210 are provided respectively corresponding to the pixels 110, and each lens 210 enlarges one pixel 110. Thus, the light blocking area 120 is not expanded, and accordingly, a screen door effect shown in FIG. 4 can be prevented from occurring.

Referring to FIG. 5, at location 0, a dark portion is generated in the comparative example, but no dark portion is generated in the exemplary embodiment. The location 0 denotes a center portion of the light blocking area 120 which is disposed between two adjacent pixels. Locations at about 0.005 and −0.005 indicate the brightest portions, which represent a center portion of each pixel. FIG. 5 shows luminance of other portions when luminance of the center portion of each pixel is about 100%. Luminance of a center portion of the light blocking area 120 disposed between two pixels is about 28% in the comparative example, and luminance of a center portion of the light blocking area 120 disposed between two pixels is about 90% in the exemplary embodiment. That is, a light blocking area between two adjacent pixels can be prevented from being viewed in the head mounted display device according to the exemplary embodiment.

As shown in FIG. 6, a distance between the pixel 110 and the lens 210 may be set to be substantially equivalent to a focal distance FL of the lens 210. However, the present invention is not limited thereto, and the pixel 110 may be disposed within a focus zone FZ where a width of light collected by the lens 210 becomes smaller than a width PW of the pixel 110. When the pixel 110 is disposed in the corresponding focus zone FZ, occurrence of the screen door effect can be prevented.

As shown in FIG. 7, the plurality of pixels 110 may include a first pixel 110a and a second pixel 110b. The plurality of lenses 210 may include a first lens 210a and a second lens 210b. Light emitted from the first pixel 110a may pass through the first lens 210a and light emitted from the second pixel 110b may pass through the second lens 210b.

The first pixel 110a, the first lens 210a, and the pupil 500 of the user may be disposed on a first extension line 700a. The second pixel 110b, the second lens 210b, and the pupil 500 of the user may be disposed on a second extension line 700b. In this case, the first extension line 700a and the second extension line 700b meet at one spot. The pupil 500 of the user is located at the spot where the first extension line 700a and the second extension line 700b meet.

Next, referring to FIG. 8, a head mounted display device according to another exemplary embodiment will be described.

Figure 8:
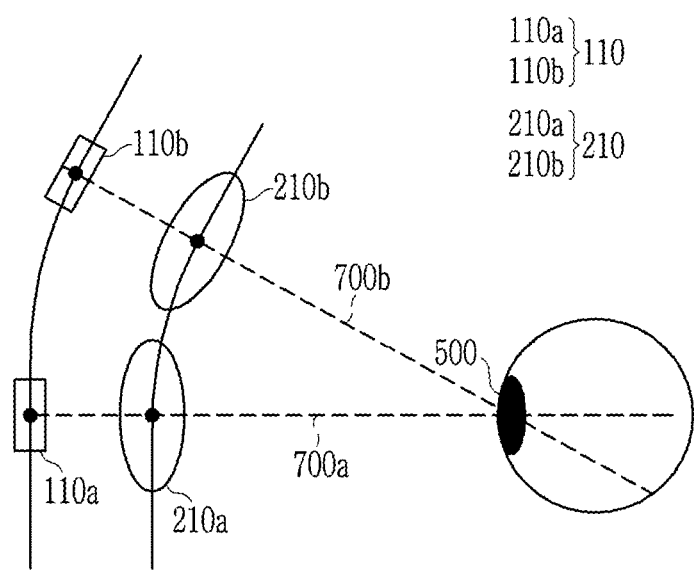
FIG. 8 is a schematic view of pixels, lenses, and a pupil of a user according to another exemplary embodiment.

A head mounted display device shown in FIG. 8 is almost the same as that of FIG. 7, and therefore a description of the same portions will be omitted. The head mounted display device according to the present exemplary embodiment is different from the above-described head mounted display device in that a display panel has a curved shaped.

FIG. 8 is a schematic view of pixels, lenses, and a pupil of a user of the head mounted display device according to the present exemplary embodiment.

The head mounted display device according to the present exemplary embodiment includes a display panel 100 (refer to FIG. 1) and a microlens array 200 (refer to FIG. 1). The display panel 100 includes a plurality of pixels 110, and the microlens array 200 includes plurality of lenses 210.

The display panel of the above-described exemplary embodiment is provided as a flat panel, while the display panel of the present exemplary embodiment is provided as a curved panel.

As shown in FIG. 8, the plurality of pixels 110 may include a first pixel 110a and a second pixel 110b. The first pixel 110a and the second pixel 110b of the above-described exemplary embodiment are disposed on a straight line, and the first pixels 110a and the second pixel 110b of the present exemplary embodiment are disposed on a curved line.

The plurality of lenses 210 may include a first lens 210a and a second lens 210b. The first lens 210a and the second lens 210b are disposed on the straight line in the above-described exemplary embodiment, and the first lens 210a and the second lens 210b of the present exemplary embodiment are disposed on a curved line.

That is, in the present exemplary embodiment, the plurality of pixels 110 are disposed on the curved line and the plurality of lenses 210 are disposed on the curved line.

Light emitted from the first pixel 110a may pass through the first lens 210a and light emitted from the second pixel 110b may pass through the second lens 210b.

The first pixel 110a, the first lens 210a, and a pupil 500 of a user may be disposed on a first extension line 700a. The second pixel 110b, the second lens 210b, and the pupil 500 of the user may be disposed on a second extension line 700b. In this case, the first extension line 700a and the second extension line 700b meet at one spot. The pupil 500 of the user is located at the spot where the first extension line 700a and the second extension line 700b meet.

The first pixel 110a and the second pixel 110b may be disposed in a circumference of a first circle having the purple 500 of the user as a center and the first microlens 210a and the second microlens 210b may be disposed in a circumference of a second circle having the purple 500 of the user as a center too. The first circle and the second circle may be a concentric circle and a radius of the first circle may be larger than a radius of the second circle.

A distance between the first pixel 110a and the pupil 500 of the user is different from a distance between the second pixel 110b and the pupil 500 of the user in the above-described exemplary embodiment. However, in the present exemplary embodiment, a distance between the first pixel 110a and the pupil 500 of the user may be equivalent to a distance between the second pixel 110b and the pupil 500 of the user.

In addition, in the above-described exemplary embodiment, a distance between the first lens 210a and the pupil 500 of the user is different from a distance between the second lens 210b and the pupil 500 of the user. However, in the present exemplary embodiment, a distance between the first lens 210a and the pupil 500 of the user may be equivalent to a distance between the second lens 210b and the pupil 500 of the user.

Further, in the above-described exemplary embodiment, a distance between the first pixel 110a and the first lens 210a is different from a distance between the second pixel 110b and the second lens 210b. However, in the present exemplary embodiment, a distance between the first pixel 110a and the first lens 210a may be equivalent to a distance between the second pixel 110b and the second lens 210b.

Hereinafter, a head mounted display device according to another exemplary embodiment will be described with reference to FIG. 9.

Figure 9:
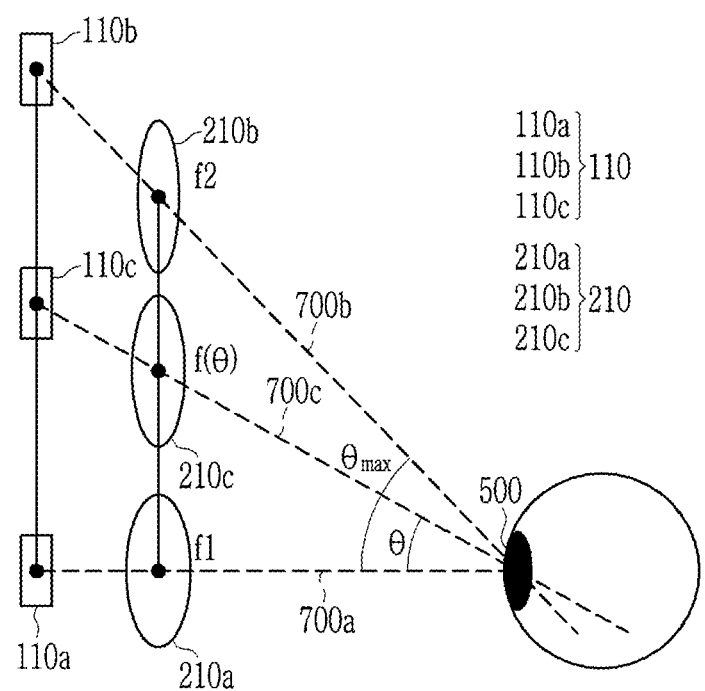
FIG. 9 is a schematic view of pixels, lenses, and a pupil of a user according to another exemplary embodiment.

The head mounted display device shown in FIG. 9 is almost the same as the head mounted display device of the above-described exemplary embodiment of FIG. 1 to FIG. 7, except for a focal distance of a plurality of lenses, and therefore the same portions will not be described. Hereinafter, the difference, which is the focal distance of the plurality of lenses, will be described in detail.

FIG. 9 is a schematic view of pixels, lenses, and a pupil of a user of the head mounted display device according to the exemplary embodiment.

The head mounted display device according to the present exemplary embodiment includes a display panel 100 (refer to FIG. 1) and a microlens array 200 (refer to FIG. 1). The display panel 100 includes a plurality of pixels 110, and the microlens array 200 includes a plurality of lenses 210.

As shown in FIG. 9, the plurality of pixels 110 may include a first pixel 110a, a second pixel 110b, and a third pixel 110c. The first pixel 110a may be disposed in a center portion of the display panel 100 and the second pixel 110b may be disposed at an edge portion of the display panel 100. The third pixel 110c may be disposed between the first pixel 110a and the second pixel 110b.

The plurality of lenses 210 may include a first lens 210a, a second lens 210b, and a third lens 210c. The first lens 210a may be disposed in a center portion of the microlens array 200 and the second lens 210b may be disposed at an edge portion of the microlens array 200. The third lens 210c may be disposed between the first lens 210a and the second lens 210b. Light emitted from the first pixel 110a may pass through the first lens 210a, light emitted from the second pixel 110b may pass through the second lens 210b, and light emitted from the third pixel 110c may pass through the third lens 210c.

The first pixel 110a, the first lens 210a, and a pupil 500 of the user may be disposed on a first extension line 700a. The second pixel 110b, the second lens 210b, and the pupil 500 of the user may be disposed on a second extension line 700b. The third pixel 110c, the third lens 210c, and the pupil 500 of the user may be disposed on a third extension line 700c. In this case, the first extension line 700a, the second extension line 700b, and the third extension line 700c meet at one spot. The pupil 500 of the user is disposed at the spot where the first extension line 700a, the second extension line 700b, and the third extension line 700c meet.

A distance between first pixel 110a and the third pixel 110c is longer than a distance between the first lens 210a and the third lens 210c. In addition, a distance between the third pixel 110c and the second pixel 110b is longer than a distance between the third lens 210c and the second lens 210b. That is, a distance between two adjacent pixels 110 among the plurality of pixels 110 is longer than a distance between two adjacent lenses 210 among the plurality of lenses 210.

A direction in which light is incident on the first lens 210a from the first pixel 110a may be different from a direction in which light is incident on the second lens 210b from the second pixel 110b. In addition, a direction in which light is incident on the second lens 210b from the second pixel 110a may be different from a direction in which light is incident on the third lens 210c from the third pixel 110b.

In this case, if the plurality of lenses 210 have the same focal distance, a focal position may be changed depending on an angle formed by a direction in which light emitted from the pixel 110 is incident on each lens 210 and an optical axis of the lens 210. Accordingly, a Petzval field curvature may occur, thereby causing deterioration of image quality. In the exemplary embodiment shown in FIG. 8, the display panel including the plurality of pixels is formed as the curved panel and the plurality of lenses are disposed on the curved line such that the focal position may not be changed even through focal distances of the plurality of lenses 210 are the same. However, in the present exemplary embodiment, the display panel is formed as a curved panel, and when the plurality of lenses are disposed on a straight line, focal distances of the plurality of lenses 210 are adjusted to set the same focal position. That is, the deterioration of image quality due to the Petzval field curvature can be prevented by differentiating the focal distances of the plurality of lenses 210.

The first lens 210a of the plurality of lens 210 has the shortest distance from the pupil 500 of the user. A direction in which light emitted from the first pixel 110a is incident on the first lens 210a may match an optical axis of the first lens 210a. In this case, the first lens 210a may have the shortest focal distance among the plurality of lenses 210.

The second lens 210b of the plurality of lens 210 has the longest distance from the pupil 500 of the user. An angle formed by a direction in which light emitted from the second pixel 110b is incident on the second lens 210b and an optical axis of the second lens 210b is relatively the greatest angle. In this case, the second lens 210b may have the longest focal distance among the plurality of lenses 210.

The third lens 210c is disposed between the first lens 210a and the second lens 210b. In this case, a focal distance of the third lens 210c may be longer than the focal distance of the first lens 210a and may be shorter than the focal distance of the second lens 210b.

The focal distance of the third lens 210c may be determined as given in Equation 1.

$$f(\theta)=(f2-f1)/\theta_{max} \times \theta + f1 \qquad \text{[Equation 1]}$$

Herein, θ denotes an angle formed by the first extension line 700a and the third extension line 700c, f1 denotes a focal distance of the first lens 210a, and f2 denotes a focal distance of the second lens 210b. $\theta_{max}$ denotes an angle formed by the first extension line 700a and the second extension line 700b. In this case, f2 is greater than f1.

f1 and f2 have a relationship as given in Equation 2.

$$f1 = f2 \times \cos(\theta_{max}) \qquad \text{[Equation 2]}$$

A focal distance of each lens 210 may be determined according to a diameter, a thickness of a center portion, and the like. For example, a thickness of a center portion of the third lens 210c is thinner than a thickness of a center portion of the first lens 210a and may be thicker than a thickness of a center portion of the second lens 210b.

At least one lens 210 may be disposed between the first lens 210a and the second lens 210b. The focal distance of the lens 210 may be gradually increased toward the second lens 210b from the first lens 210a. That is, the focal distance of the lens 210 may be gradually increased from the center portion of the microlens array 200 toward an edge portion of the array 200.

Next, a head mounted display device according to another exemplary embodiment will be described with reference to FIG. 10.

Figure 10:
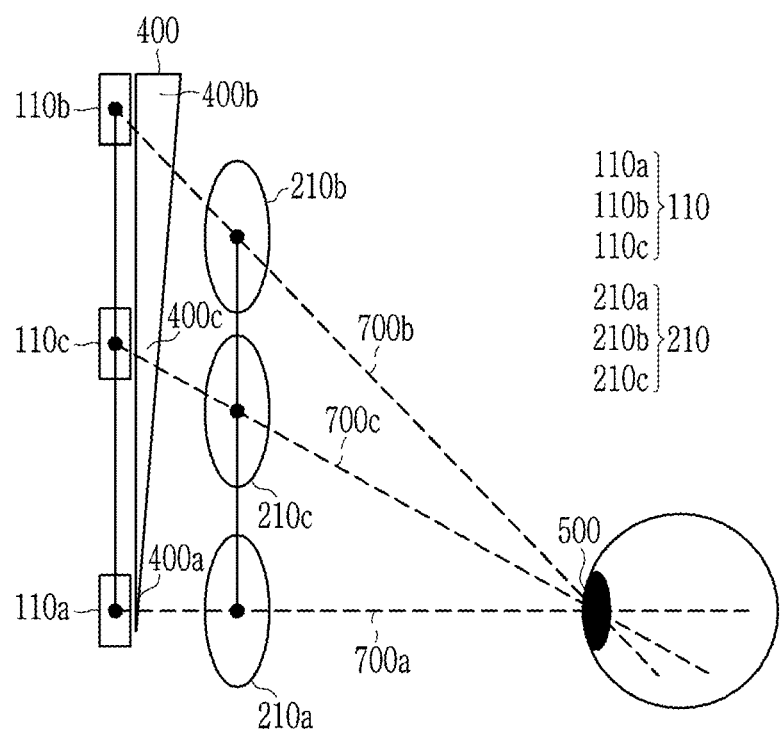
FIG. 10 is a schematic view of pixels, lenses, and a pupil of a user according to another exemplary embodiment.

The head mounted display device shown in FIG. 10 is almost the same as the head mounted display device of the above-described exemplary embodiment of FIG. 1 to FIG. 7, except that a correction layer is provided between a display panel and a microlens array, and therefore the same portions will not be described. Hereinafter, the correction layer disposed between the display panel and the microlens array will be described in detail.

FIG. 10 is a schematic view of pixels, lenses, and a pupil of a user of the head mounted display device according to the present exemplary embodiment.

The head mounted display device according to the exemplary embodiment includes a display panel 100 (refer to FIG. 1) and a microlens array 200 (refer to FIG. 1). The display panel 100 includes a plurality of pixels 110, and the microlens array 200 includes a plurality of lenses 210.

As shown in FIG. 10, the head mounted display device according to the present exemplary embodiment further includes a correction layer 400. The correction layer 400 is disposed between the plurality of pixels 110 and the plurality of lenses 210. That is, the correction layer 400 is disposed between the display panel 100 and the microlens array 200.

The correction layer 400 is provided as a film and may be attached to the display panel 100 or the microlens array 200, or may be provided as an additional layer on the display panel 100 through a photo and etching process. However, the present invention is not limited thereto, and the correction layer 400 may have various shapes and may be formed through various methods. The correction layer 400 may be formed of a material having a higher refractive index than the surroundings. The surroundings may be another layer adjacent to the correction layer 400 or air.

The plurality of pixels 110 may include a first pixel 110a, a second pixel 110b, and a third pixel 110c. The first pixel 110a may be disposed in a center portion of the display panel 100 and the second pixel 110b may be disposed in an edge portion of the display panel 100. The third pixel 110c may be disposed between the first pixel 110a and the second pixel 110b.

The plurality of lens 210 may include a first lens 210a, a second lens 210b, and a third lens 210c. The first lens 210a may be disposed in a center portion of the microlens array 200 and the second lens 210b may be disposed in an edge portion of the microlens array 200. The third lens 210c may be disposed between the first lens 210a and the second lens 210b. Light emitted from the first pixel 110a may pass through the first lens 210a, light emitted from the second pixel 110b may pass through the second lens 210b, and light emitted from the third pixel 110c may pass through the third lens 210c.

The first lens 210a, the second lens 210b, and the third lens 210c may have the same focal distance.

The first pixel 110a, the first lens 210a, and a pupil of a user may be disposed on a first extension line 700a. The second pixel 110b, the second lens 210b, and the pupil 500 of the user may be disposed on a second extension line 700b. The third pixel 110c, the third lens 210c, and the pupil 500 of the user may be disposed on a third extension line 700c. In this case, the first extension line 700a, the second extension line 700b, and the third extension line 700c meet at one spot. The pupil 500 of the user is disposed at the spot where the first extension line 700a, the second extension line 700b, and the third extension line 700c meet.

A distance between first pixel 110a and the third pixel 110c is longer than a distance between the first lens 210a and the third lens 210c. In addition, a distance between the third pixel 110c and the second pixel 110b is longer than a distance between the third lens 210c and the second lens 210b. That is, a distance between two adjacent pixels 110 among the plurality of pixels 110 is longer than a distance between two adjacent lenses 210 among the plurality of lenses 210.

A thickness of the correction layer 400 may be different depending on a location of the correction layer 400.

The first lens 210a of the plurality of lens 210 has the shortest distance from the pupil 500 of the user. A direction in which light emitted from the first pixel 110a is incident on the first lens 210a may match an optical axis of the first lens 210a. In this case, a first portion 400a of the correction layer 400, disposed between the first pixel 110a and the first lens 210a, may have the thinnest thickness.

The second lens 210b of the plurality of lens 210 has the longest distance from the pupil 500 of the user. An angle formed by a direction in which light emitted from the second pixel 110b is incident on the second lens 210b and an optical axis of the second lens 210b is relatively the greatest angle. In this case, a second portion 400b of the correction layer 400, disposed between the second pixel 110b and the second lens 210b, may have the greatest thickness.

The third lens 210c is disposed between the first lens 210a and the second lens 210b. In this case, a thickness of a third portion 400c of the correction layer 400, disposed between the third pixel 110c and the third lens 210c may be thicker than the thickness of the first portion 400a and may be thinner than the second portion 400b.

The thickness of the correction layer 400 may be gradually increased from the first portion 400a to the second portion 400b. That is, the thickness of the correction layer 400 may be gradually increased from a center to an edge thereof.

Next, a head mounted display device according to another exemplary embodiment will be described with reference to FIG. 11.

Figure 11:
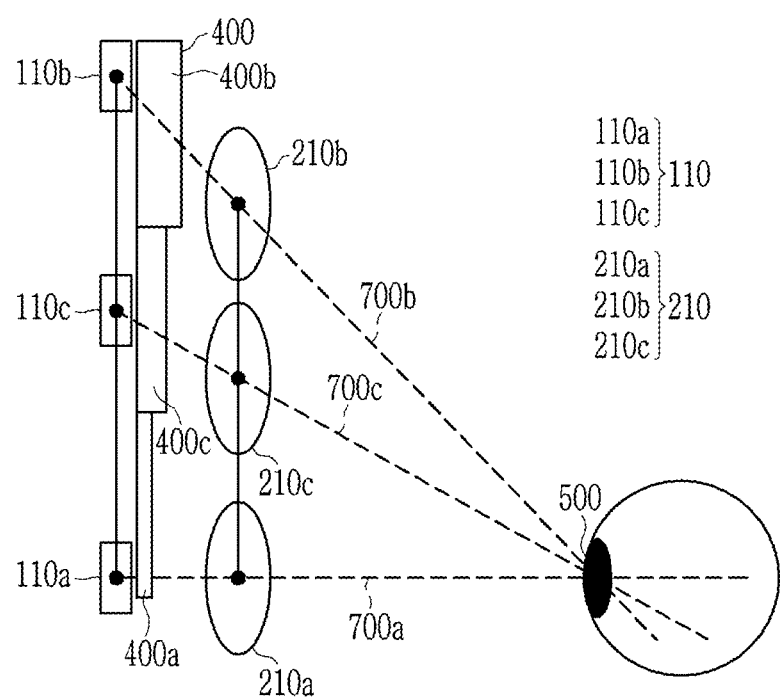
FIG. 11 is a schematic view of pixels, lenses, and a pupil of a user according to another exemplary embodiment.

The head mounted display device shown in FIG. 11 is almost the same as the head mounted display device of the above-described exemplary embodiment of FIG. 10, except for the shape of a correction layer, and therefore the same portions will not be described. Hereinafter, the shape of the correction layer will be described in detail.

FIG. 11 is a schematic view of pixels, lenses, and a pupil of a user of the head mounted display device according to the present exemplary embodiment.

The head mounted display device according to the present exemplary embodiment includes a display panel 100 (refer to FIG. 1), a microlens array 200 (refer to FIG. 1), and a correction layer 400.

As in the above-described exemplary embodiment, the correction layer 400 may have a thickness that varies depending on locations.

A first portion 400a of the correction layer 400, disposed between the first pixel 110a and the first lens 210a, may have the thinnest thickness in the correction layer 400. A second portion 400b of the correction layer 400, disposed between the second pixel 110b and the second lens 210b, may have the largest thickness in the correction layer 400. A thickness of a third portion 400c of the correction layer 400, disposed between the third pixel 110c and the third lens 210c, may be thicker than the thickness of the first portion 400a and may be thinner than the thickness of the second portion 400b.

The thickness of the correction layer 400 may be increased step by step from the first portion 400a toward the second portion 400b. That is, the thickness of the correction layer 400 may be increased step by step from the center to the edge thereof.

In FIG. 11, the thickness of the correction layer 400 is changed in three steps, but the present invention is not limited thereto. The thickness of the correction layer 400 may be changed in more than three steps.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A head mounted display device comprising:
a display panel including a plurality of pixels, wherein the pixels include a first pixel, a second pixel, and a third pixel disposed between the first pixel and the second pixel; and
a microlens array that includes a plurality of lenses, wherein the lenses include a first lens, a second lens, and a third lens respectively corresponding to the first pixel, the second pixel, and the third pixel,
wherein the lenses have different focal distances,
wherein a distance between a center of the first pixel and a center of the third pixel is longer than a distance between a center of the first lens and a center of the third lens, and
wherein a distance between the center of the third pixel and a center of the second pixel is longer than a distance between the center of the third lens and the center of the second lens.

2. The head mounted display device of claim 1, wherein the first lens has a shortest distance from a pupil of a user and has the shortest focal distance among the plurality of lenses.

3. The head mounted display device of claim 2, wherein the second lens has a longest distance from the pupil of the user and has the longest focal distance among the plurality of lenses.

4. The head mounted display device of claim 1, wherein a distance between two adjacent pixels among the plurality of pixels is longer than a distance between two adjacent lenses among the plurality of lenses.

5. The head mounted display device of claim 1, wherein the number of the plurality of pixels corresponds to the number of the plurality of lenses.

6. A head mounted display device comprising:
a display panel including a plurality of pixels; and
a microlens array including a plurality of lenses, wherein the lenses respectively correspond to the pixels and comprise a first lens, a second lens, and a third lens that is disposed between the first lens and the second lens, and wherein a focal distance of the third lens satisfies the following equation:

$$f(\theta)=(f2-f1)/\theta_{max}\times\theta+f1$$

($\theta$: an angle formed by a first extension line that connects the pupil of the user and the first lens and a third extension line that connects the pupil of the user and the third lens, f1: a focal distance of the first lens, f2: a focal distance of the second lens, $\theta_{max}$: an angle formed by the first extension line and a second extension line that connects the pupil of the user and the second lens).

7. The head mounted display device of claim 6, wherein the first lens is disposed in a center portion of the microlens array, and the second lens is disposed in an edge portion of the microlens array.

8. The head mounted display device of claim 7, wherein a focal distance of the lens is gradually increased from the center portion of the microlens array toward the edge portion of the microlens array.

9. The head mounted display device of claim 6, wherein the plurality of pixels comprises a first pixel, a second pixel, and a third pixel, light emitted from the first pixel passes through the first lens, light emitted from the second pixel passes through the second lens, and light emitted from the third pixel passes through the third lens.

10. The head mounted display device of claim 9, wherein the first extension line goes through the first pixel, the second extension line goes through the second pixel, the third extension line goes through the third pixel, and the first extension line, the second extension line, and the third extension line meet at one spot.

11. The head mounted display device of claim 10, wherein the pupil of the user is located at the spot where the first extension line, the second extension line, and the third extension line meet.

12. The head mounted display device of claim 9, wherein a thickness of a center portion of the third lens is thinner than a thickness of a center portion of the first lens and thicker than a thickness of a center portion of the second lens.

13. The head mounted display device of claim 9, wherein a distance between the first pixel and the third pixel is longer than a distance between the first lens and the third lens, and a distance between the third pixel and the second pixel is longer than a distance between the third lens and the second lens.

14. A head mounted display device comprising:
a display panel that includes a plurality of pixels, wherein the pixels include two pixels;
a microlens array that includes a plurality of lenses, wherein the lenses include two lenses, wherein the two lenses respectively correspond to the two pixels, and wherein a distance between centers of the two pixels in a direction is longer than a distance between centers of the two lenses in the direction; and a correction layer that is provided between the display panel and the microlens array.

15. The head mounted display device of claim 14, wherein thicknesses of the correction layer depend on locations at the correction layer.

16. The head mounted display device of claim 15, wherein the plurality of lenses comprises a first lens having a shortest distance from a pupil of a user, the plurality of pixels comprises a first pixel that supplies light to the first lens, and a first portion of the correction layer, disposed between the first lens and the first pixel, has the thinnest thickness of the correction layer.

17. The head mounted display device of claim 16, wherein the plurality of lenses further comprises a second lens having a longest distance from the pupil of the user, the plurality of pixels further comprises a second pixel that supplies light to the second lens, and a second portion of the correction layer, disposed between the second lens and the second pixel, has the greatest thickness of the correction layer.

18. The head mounted display device of claim 17, wherein a thickness of the correction layer is gradually increased from the first portion toward the second portion.

19. The head mounted display device of claim 17, wherein the thicknesses of the correction layer increase step by step from the first portion toward the second portion.

20. The head mounted display device of claim 17, wherein the first lens is disposed in a center portion of the microlens array and the second lens is disposed in an edge portion of the microlens array.

21. The head mounted display device of claim 17, wherein a first extension line that connects the first pixel and the first lens and a second extension line that connects the second pixel and the second lens meet at a spot where the pupil of the user is located.

22. The head mounted display device of claim 17, wherein a distance between the first pixel and the second pixel in the direction is longer than a distance between the first lens and the second lens in the direction.

23. The head mounted display device of claim 14, wherein no intervening pixel is positioned between the two pixels in the direction, and no intervening lens is positioned between the two lenses in the direction.

24. The head mounted display device of claim 14, wherein the correction layer is formed of a material having a higher refractive index than the surroundings.

25. The head mounted display device of claim 14, wherein the lenses have the same focal distance.

* * * * *